Patented June 8, 1954

2,680,746

UNITED STATES PATENT OFFICE 2,680,746

ETHER OF GLYCOLIC ACID

Gottfried Schäppi, Ruschlikon, Switzerland, assignor to Hamol A.-G., Zurich, Switzerland No Drawing. Application August 29, 1950,
Serial No. 188,901

Claims priority, application Switzerland
August 31, 1949

1 Claim. (Cl. 260—343.2)

The present invention relates to new ethers of glycolic acid, which are useful as fluorescents and screening agents for ultraviolet light.

More specifically, the invention relates particularly to the glycolic acid ethers of hydroxycoumarins and the salts thereof, which correspond to the general formula

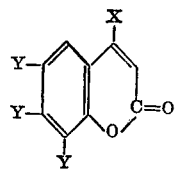

wherein X is a member selected from the group alkyl, substituted alkyl, carboxyl and hydrogen, at least one Y corresponds to the group

ZOCO—CH$_2$—O— the others being a member selected from the group ZOCO—CH$_2$—O—, alkoxy, OH and hydrogen, whereby Z is a member selected from the group hydrogen and basic ion constituents.

The group X may be hydrogen, an alkyl substituent as methyl, ethyl, propyl, butyl and the like or the group COOH, CH$_2$—COOH, C$_2$H$_4$COOH, C$_3$H$_5$ COOH etc.

Where Y is not the glycolic acid ether radical it may be either hydrogen, OH or CH$_3$O—, C$_2$H$_5$O—, C$_3$H$_7$O— etc.

Z is preferably an alkali metal.

Whereas all compounds falling within the scope of the above cited formula are useful and valuable absorbents for ultraviolet light and optical bleaching agents the preferred compound of this class is the glycolic acid ether of β-methyl-umbelliferone and the salts thereof, corresponding to the formula

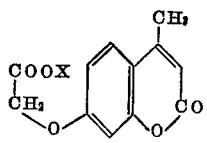

The preparation of glycolic acid ethers of simple aromatic hydroxy-compounds (for example phenol, eugenol, naphthol etc.) is known. I have now found, that lactones of o-hydroxy-cinnamic acids, which are substituted at least by one further free hydroxy-group, that is to say the hydroxy-coumarins, may be converted to the corresponding glycolic acid ethers without irreversibly splitting up the lactone linkage. This is very surprising and unexpected because said lactone linkages are known to be very unstable in most cases.

The new glycolic ethers possess valuable ultraviolet-light absorbing and fluorescent properties. They may be used for example as a screening agent against ultra-violet-light in suntan preparation, as an optical bleaching or whitening agent in soap products, textile finishing, laundering, plastics, paper products or as an intermediate in organic syntheses.

Unlike simple hydroxycoumarins the glycolic acid ethers thereof give salts which are practically neutral in chemical reaction and can be used in slightly acid, as well as in neutral or alkaline solutions; whereas solutions of salts of the unetherified hydroxycoumarins are stable only in the alkaline range.

The new glycolic acid ethers may be prepared by reacting a haloacetic acid or a derivative thereof, for example a salt or an ester, with hydroxycoumarin or a derivative thereof, for example a metal derivative. The reaction may be carried out in the heat and/or the presence of a solvent.

The invention is illustrated in greater detail by the following, not limitative example, in which the proportions of the ingredients are expressed as parts by weight.

*Example*

17.6 parts of β-methyl-umbelliferone are suspended in 35 parts of water and dissolved by adding 11.2 parts of a 50% aqueous solution of potassium hydroxide. Then a solution of 10 parts chloroacetic acid, neutralized by 5,6 parts of sodium carbonate, in 15 parts of water is added and the mixture boiled for five hours. The whole reaction product is precipitated by acidifying with sulfuric acid, the glycolic acid ether dissolved by adding bicarbonate solution (until a pH value of about 7 is reached) and filtered off from the deposit. The glycolic acid ether of β-methyl-umbelliferone is isolated from the filtrate by precipitating with acid and sucking off, it may be recrystallized from a suitable solvent such as alcohol or water. It is a white crystalline powder of the melting point 203° C. and gives salts that are stable in slightly acid, as well as in neutral or alkaline solutions.

What I claim as new is:

As a new compound the glycolic acid ether of β-methylumbelliferone and its salts.

References Cited in the file of this patent

UNITED STATES PATENTS

| Number | Name | Date |
|---|---|---|
| 1,934,361 | Levinson | Nov. 7, 1933 |